(12) United States Patent
Endo et al.

(10) Patent No.: US 6,519,090 B2
(45) Date of Patent: Feb. 11, 2003

(54) EYEPIECE OPTICAL SYSTEM (75) Inventors: Takeshi Endo, Osaka (JP); Yasushi Kobayashi, Itami (JP)

(73) Assignee: Minolta Co., Ltd., Osaka (JP)

( * ) Notice: Subject to any disclaimer, the term of this patent is extended or adjusted under 35 U.S.C. 154(b) by 83 days.

(21) Appl. No.: 09/880,436

(22) Filed: Jun. 13, 2001

(65) Prior Publication Data

US 2002/0024743 A1 Feb. 28, 2002

(30) Foreign Application Priority Data

Jun. 13, 2000 (JP) ......................... 2000-176278

(51) Int. Cl.$^7$ ......................... G02B 25/00; G02B 27/14; G02F 1/1335
(52) U.S. Cl. ..................... 359/643; 359/631; 349/11
(58) Field of Search ................... 359/643–645, 359/13–14, 629–631, 633–634, 483, 501, 850; 349/11, 13, 96, 98, 113–115

(56) References Cited

U.S. PATENT DOCUMENTS

| 5,654,828 A | 8/1997 | Togino et al. | ............... 359/633 |
|---|---|---|---|
| 5,715,023 A | * 2/1998 | Hoppe | ........................ 349/11 |
| 6,075,651 A | * 6/2000 | Hoppe | ........................ 359/641 |
| 6,094,242 A | 7/2000 | Yamanaka | ................... 349/13 |
| 6,349,004 B1 | * 2/2002 | Fischer et al. | ............... 359/708 |

FOREIGN PATENT DOCUMENTS

| JP | 08-110492 A | 4/1996 |
|---|---|---|
| JP | 08-327940 A | 12/1996 |

* cited by examiner

Primary Examiner—Jordan M. Schwartz
(74) Attorney, Agent, or Firm—Sidley Austin Brown & Wood LLP (57) ABSTRACT

A head-mounted display device and an eyepiece optical system suitable for use in the head-mounted display device is provided. The eyepiece optical system is capable of enlarging and displaying, to an eye of an observer, an image displayed on a two-dimensional display element. The eyepiece optical system includes, sequentially from the observer's eye, an aspherical resin lens, a spherical glass lens, and a polarization-conversion element disposed between the spherical glass lens and the two-dimensional display element. On a surface of the aspherical resin lens is provided a circularly-polarized-light-selective reflecting-transmitting surface for selectively reflecting and transmitting projection image light from the two-dimensional display element, depending on a rotation direction of circularly-polarized rays of the projection image light.

29 Claims, 7 Drawing Sheets

EYEPIECE OPTICAL SYSTEM

RELATED APPLICATION

This application is based on Japanese Patent Application No. 2000-176278 filed in Japan, the content of which is hereby incorporated by reference.

BACKGROUND

1. Field of the Invention

The present invention relates to a head-mounted display device and an eyepiece optical system suitable for use in said head-mounted display device which projects a two-dimensional image displayed on a display panel such as a liquid crystal display element onto the eye of an observer who perceives an enlarged virtual image.

2. Description of the Related Art

Conventionally, head-mounted display devices are equipped with a closed frame unit, an eyepiece optical system, and a mounting member (band, etc.) by which it may be mounted onto the user's head. This type of head-mounted display device is mounted on the user's head so that the eyepiece optical system is aligned with the user's eyes, such that by looking inside the frame unit at the eyepiece optical system, a video image, television broadcast image or game image may be observed. When this image viewing device is used, the user may concentrate on the image and obtain a feeling of realism as if he himself were inside the image.

Conventionally, such head-mounted display devices include eyepiece optical systems having a so-called pancake structure wherein a planar two-dimensional projection image is enlarged using a reflective-transparent surface, and the enlarged image is viewed. For example, Japanese Laid-Open Patent Application No. 8-110492 discloses a structure comprising a partial optical system having at least two semi-transparent surfaces arranged so as to at least transmit one light ray and at least reflect one light ray, and a refractive optical element having optical power.

Furthermore, Japanese Laid-Open Patent Application No. 8-327940 discloses a structure which renders the device thin, compact and lightweight by providing a reflective-refractive element having a semi-transparent mirror coating and a circularly-polarized-light-selective semi-transparent mirror arranged sequentially from the ray entrance side, such that when an incident ray is a specific circularly-polarized ray, the circularly-polarized-light-selective semi-transparent mirror selectively reflects and transmits the incident ray by polarization, the optical power (magnification) of the refractive system is increased, and the field angle is enlarged by the incident light passing one-way between the reflective-refractive element and the selective semi-transparent mirror.

On the other hand, in order to realize an eyepiece optical system having less distortion and a thinner form-factor than a conventional co-axial type refractive optical system, it is desirable to examine the lens material and position of aspherical surfaces and spherical surfaces, aspects which are not mentioned in the conventional art.

SUMMARY

An object of the present invention is to overcome these and other shortcomings of the prior art designs.

Another object of the present invention is to provide a head-mounted display device having an improved eyepiece optical system.

Another object of the present invention is to provide an eyepiece optical system capable of displaying a high quality virtual image which is thinner and has a shorter total length than conventional systems.

These objects are attained by a head-mounted display device comprising an eyepiece optical system which enlarges and displays a projection image displayed on a two-dimensional display element onto the eye of an observer, said eyepiece optical system comprising sequentially from an observer's eye:

an aspherical resin lens having a first surface which is aspherical and a second surface which is approximately planar;

a spherical glass lens having a first surface which is concave; and a polarization-conversion element for converting the projection light from the two-dimensional element to polarized light disposed between the spherical-surface glass lens and the two-dimensional display element;

wherein the second surface of the aspherical resin lens is provided with a circularly-polarized-light-selective reflecting-transmitting surface for selectively reflecting and transmitting projection image light from the two-dimensional display element depending on the rotation direction of the circularly-polarized rays, and the first surface of the spherical glass lens is provided with a semi-transparent mirror surface.

These objects are further attained by a head-mounted display device comprising an eyepiece optical system which enlarges and displays a projection image displayed on a two-dimensional display element onto an eye of an observer, said eyepiece optical system comprising sequentially from the observer's eye:

an aspherical resin lens having a first surface which is aspherical and a second surface which is approximately planar;

a spherical glass lens having a first surface which is concave and a second surface which is convex; and a polarization-conversion element for converting the projection light from the two-dimensional element to polarized light disposed between the spherical glass lens and the two-dimensional display element;

wherein the second surface of the aspherical resin lens is provided with a circularly-polarized-light-selective reflecting-transmitting surface for selectively reflecting and transmitting projection image light from the two-dimensional display element depending on the rotation direction of the circularly-polarized rays, and either the first surface or the second surface of the spherical glass lens is provided with a semi-transparent mirror surface.

The circularly-polarized-light-selective reflecting-transmitting surface is desirably formed of cholesteric liquid crystal. It is further desirable that the circularly-polarized-light-selective reflecting-transmitting surface comprises a ¼ wavelength plate and a reflective-type polarizing plate.

It is also desirable that the polarization-conversion element comprises a polarizing plate and a ¼ wavelength plate. The two-dimensional display element is desirably a liquid crystal panel, and the polarization-conversion element is desirable a ¼ wavelength plate.

BRIEF DESCRIPTION OF THE DRAWINGS

This and other objects and features of this invention will become clear from the following description taken in conjunction with the preferred embodiments with reference to the accompanying drawings, in which.

DETAILED DESCRIPTION OF THE INVENTION

Figure 1A:
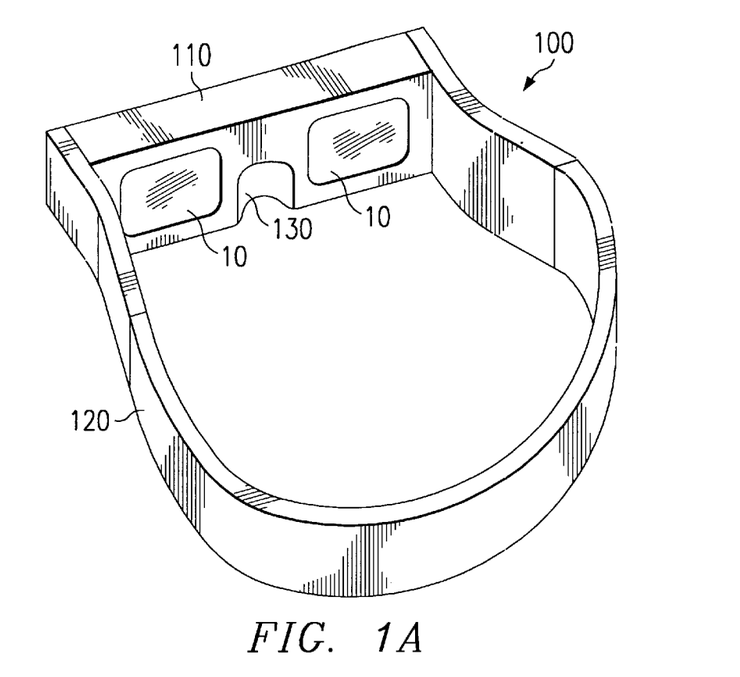
FIGS. 1A, 1B and 1C are perspective views, each showing the exterior configuration of a head-mounted display device embodying features of the present invention.
Figure 1B:
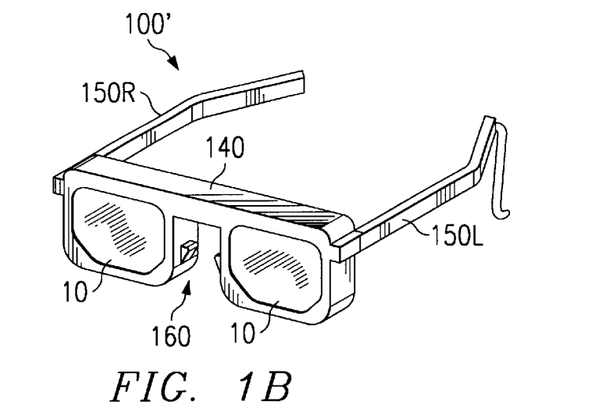
Figure 1C:
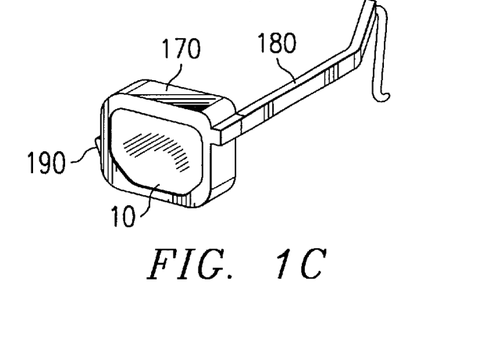

The embodiments of the present invention are described hereinafter with reference to the accompanying drawings. FIGS. 1A, 1B and 1C each show a perspective view of the exterior configuration of a head-mounted display device 100, 100', and 100" embodying features of the present invention. The head-mounted display device 100 shown in FIG. 1A is equipped with a frame member 110 and a band 120 that serves as a mounting member for mounting the frame member 110 onto a user's head. A concave portion 130 is provided for supporting the frame member 110 on a user's nose when worn. An eyepiece optical system 10 is fixed into each of a right and left portion of the frame member 110. When the head-mounted display device 100 is mounted on the user's head, each of the eyepiece optical systems 10 should be aligned with a respective visual axis of each of the user's eyes.

FIG. 1B shows a head-mounted display device 100' comprising a frame member 140, a pair of temples 150R and 150L fixed to opposing edges of the frame member 140, a nosepad assembly 160 fixed to a middle portion of the frame member 140, and an eyepiece optical system 10 is fixed into each of a right and left portion of the frame member 140. When the head-mounted display device 100' is mounted on the user's head, each of the eyepiece optical systems 10 should be aligned with a respective visual axis of each of the user's eyes.

In the above-described head-mounted display devices 100 and 100' it is not necessary that an eyepiece optical system 10 be provided in both a right and a left portion of the frame members 110 and 140. Rather, it may be desirable to include an eyepiece optical system 10 in only one of the right and left portions of either of the frame members 110 and 140.

Alternately, an arrangement such as the head-mounted display device 100" shown in FIG. 1C may be desirable. The head-mounted display device 100" includes a frame member 170, a temple 180 fixed to an edge portion of the frame member 170, and a nosepad assembly 190 fixed to an opposing edge portion of the frame member 170. When the head-mounted display device 100" is mounted on the user's head, the eyepiece optical system 10 should be aligned with a visual axis of the user's left eye. Of course, the head-mounted display 100" may be similarly configured so that when mounted on the user's head, the eyepiece optical system 10 is aligned with a visual axis of the user's right eye.

Figure 2:
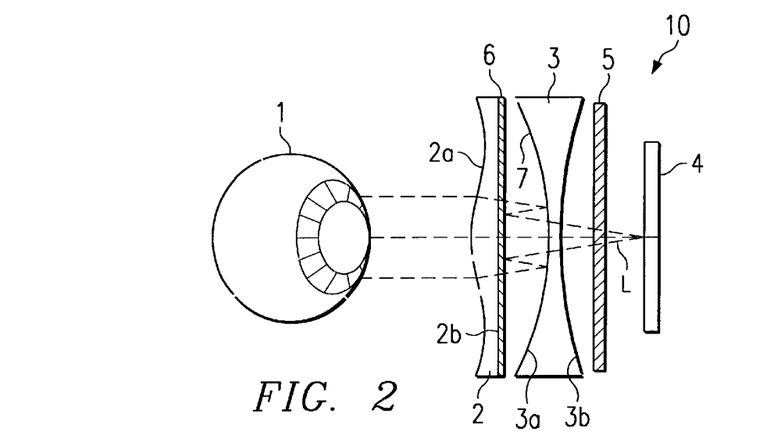
FIG. 2 is a view schematically showing the basic structure of a first embodiment of the eyepiece optical system of the present invention.

FIG. 2 is a view schematically showing the general structure of an eyepiece optical system 10 in accordance with a first embodiment of the present invention. The eyepiece optical system 10 comprises an aspherical-surface resin lens 2 having a circularly-polarized-light-selective reflecting-transmitting surface 6 formed thereon, a spherical-surface glass lens 3 having a semi-transparent mirror surface 7 formed thereon, a polarization-conversion element 5, and a two-dimensional display element 4.

As shown in FIG. 2, a projection light L emitted from the two-dimensional display element 4 is converted to a specific unidirectional circularly-polarized light by the polarization-conversion element 5, and enters a second surface 3b of the spherical-surface glass lens 3, which is a second lens, then is refracted and transmitted through the spherical-surface glass lens 3 and the semi-transparent mirror surface 7 formed on a first surface 3a, and thereafter arrives at a second surface 2b of the aspherical-surface resin lens 2, which is a first lens.

The circularly-polarized-light-selective reflecting-transmitting surface 6 is formed on the second surface 2b of the aspherical-surface resin lens 2 to reflect the specific unidirectional polarized light emitted from the polarization-conversion element 5 without changing the rotation direction. Part of the reflected circularly-polarized light is reflected by the semi-transparent mirror surface 7 formed on the first surface 3a of the spherical-surface glass lens 3 which reverses the rotation direction of this light which then again arrives at the second surface 2b of the aspherical-surface resin lens 2.

The circularly-polarized light which had its rotation direction reversed is transmitted through the circularly-polarized-light-selective reflecting-transmitting surface 6 formed on the second surface 2b of the aspherical-surface resin lens 2, is then refracted by the refracting action of the aspherical-surface resin lens 2, and thereafter exits from the first surface 2a and is directed to an observer eye 1. In this way, the eyepiece optical system 10 can be realized which is thinner and more compact than a conventional coaxial-type refractive optical system by having the semi-transparent mirror surface 7 function effectively as a reflective surface having positive optical power.

In the optical system described above, the circularly-polarized-light-selective reflecting-transmitting surface 6 properly functions to selectively reflect and transmit light in accordance with the direction of polarization of the projection image light (polarized light). Accordingly, when an optical element having birefringence is disposed between the polarization-conversion element 5 and the circularly-polarized-light-selective reflecting-transmitting surface 6, not only is the loss of projection image light increased, but ghost image light is disadvantageously generated and enters the observer eye 1.

The second lens, on which the semi-transparent mirror surface 7 is formed, is desirably made of glass having a small birefringence and not made of resin. Since providing an aspherical surface on a glass lens generally has many disadvantages concerning surface precision and manufacturing costs, in the present invention the second lens is a spherical-surface glass lens 3 having both surfaces polished to a spherical surface. Then, aberration correction is effectively accomplished by the aspherical surface provided on the first surface 2a of the aspherical-surface resin lens 2, which is the first lens.

Since the aforesaid problems are not generated even when the first lens is a resin lens having a large birefringence, an inexpensive and easily manufactured aspherical-surface molded lens may be used as the aspherical-surface resin lens 2. Since it is necessary to cement a circularly-polarized-light-selective reflection element such as a cholesteric liquid crystal or the like described later onto the surface of the second surface 2b of the aspherical-surface resin lens 2 so as to function as the circularly-polarized-light-selective reflecting-transmitting surface 6, the surface must be a planar surface or a slightly curved surface which is effectively planar optically.

Figure 3:
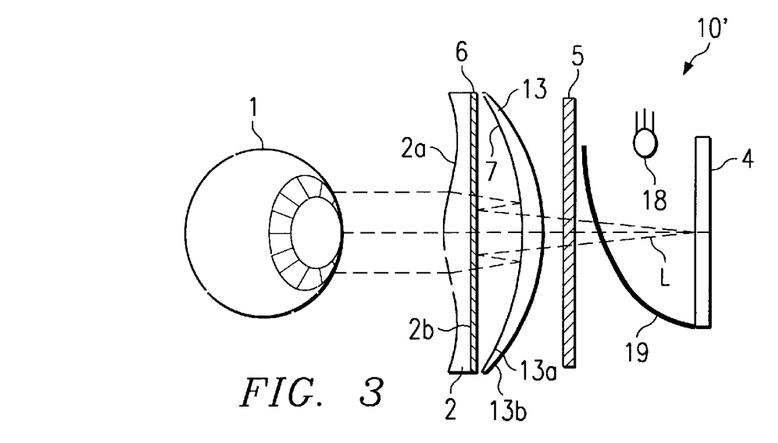
FIG. 3 is a view schematically showing the basic structure of a second embodiment of the eyepiece optical system of the present invention.

FIG. 3 schematically shows the basic structure of an eyepiece optical system 10' in accordance with a second embodiment of the present invention. The eyepiece optical system 10' may be used in any of the head-mounted display devices 100, 100', and 100" in place of eyepiece optical system 10. The eyepiece optical system 10' comprises an aspherical-surface resin lens 2 having a circularly-polarized-light-selective reflecting-transmitting surface 6 formed thereon, a spherical-surface glass lens 13 having a semi-transparent mirror surface 7 formed thereon, a polarization-conversion element 5, and a two-dimensional display element 4.

In FIG. 3, a projection light L emitted from the two-dimensional display element 4 is converted to a specific unidirectional circularly-polarized light by the polarization-conversion element 5, and enters a second surface 13b of the spherical-surface glass lens 13, which is the second lens, then is refracted and transmitted through the spherical-surface glass lens 13 and the semi-transparent mirror surface 7 formed on the first surface 13a, and thereafter arrives at the second surface 2b of the aspherical-surface resin lens 2, which is the first lens.

The circularly-polarized-light-selective reflecting-transmitting surface 6 is formed on the second surface 2b of the aspherical resin lens 2 to reflect the specific unidirectional circularly-polarized light emitted from the polarization-conversion element 5 without changing the rotation direction. Part of the reflected circularly-polarized light is reflected by the semi-transparent mirror surface 7 formed on the first surface 13a of the spherical-surface glass lens 13 which reverses the rotation direction of this light which then again arrives at the second surface 2b of the aspherical-surface resin lens 2.

The circularly-polarized light, which had its rotation direction reversed is transmitted through the circularly-polarized-light-selective reflecting-transmitting surface 6 formed on the second surface 2b of the aspherical-surface resin lens 2, is then refracted by the refracting action of the aspherical-surface resin lens 2, and thereafter exits from the first surface 2a and is directed to an observer eye 1. In this way, the eyepiece optical system 10' can be realized which is thinner and more compact than a conventional coaxial-type refractive optical system by having the semi-transparent mirror surface 7 function effectively as a reflective surface having positive optical power.

The shape of the spherical-surface glass lens 13 is desirably a concentric shape relative to the pupil position of the observer eye 1, i.e., the first surface counting sequentially from the observer eye side is a concave surface, and the second surface is a convex surface to correct aberration. Furthermore, when the two-dimensional display element 4 is an element having large angle characteristics of projection image light intensity as in the case of a liquid crystal panel, a telecentric structure on the image side is easily accomplished by having the concave second surface 13b possess positive refractive power.

Furthermore, a frontal illumination optical system can be easily inserted because the spacing (lens back) of the second surface 13b and the two-dimensional display element 4 can be lengthened when a reflective-type two-dimensional display element such as a reflective-type liquid crystal or the like is used as a reflective-type two-dimensional display element 4, as in the present embodiment. As shown in FIG. 3, the light from an illumination light source 18 is reflected by a semi-transparent mirror 19 disposed between the polarization-conversion element 5 and the two-dimensional display element 4, and illuminates the two-dimensional display element 4.

Although a semi-transparent mirror surface 7 is formed on the concave first surface 13a of the spherical-surface glass lens 13 in the present embodiment, a similar effect obviously can be obtained by forming the semi-transparent mirror surface 7 on the convex second surface 13b because it functions as a reflective surface having positive optical power.

Figure 4A:
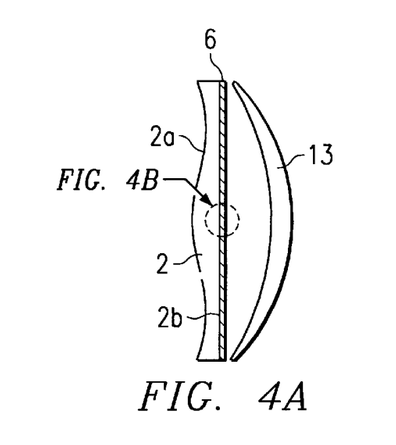
FIG. 4A is a view schematically showing a portion of the basic structure of an eyepiece optical system of the present invention.
Figure 4B:
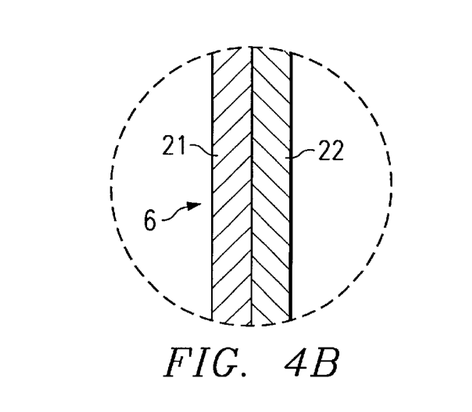
FIG. 4B is an enlarged view of a portion of the circularly-polarized-light-selective reflecting-transmitting surface shown in FIG. 4A.

FIGS. 4A and 4B illustrate the structure of the circularly-polarized-light-selective reflecting-transmitting surface 6. FIG. 4A shows the disposition of the aspherical-surface resin lens 2 and the spherical-surface glass lens 3 of FIG. 3. FIG. 4B shows an enlargement of a cross section of the circularly-polarized-light-selective reflecting-transmitting surface 6 formed on the second surface 2b of the aspherical-surface resin lens 2. The circularly-polarized-light-selective reflecting-transmitting surface 6 can be constructed by cementing the reflective-type polarization plate 21 and a ¼ wavelength plate 22. Alternatively, a cholesteric liquid crystal having a chiral structure also may be used such that the specific unidirectional polarized light is reflected, and the circularly-polarized light in the reflection direction is transmitted.

As shown in FIG. 4A, an effect similar to that of a cholesteric liquid crystal can be obtained if the reflective-type polarization plate 21 is cemented to the second surface 2b of the aspherical surface resin lens 2 on the observer eye side. The structure of the previously described circularly-polarized light reflecting-transmitting surface 6 also may be identical to that of the first embodiment.

In each of the previously described embodiments, the polarization-conversion element 5 for converting the projection image light L emitted from the two-dimensional display element 4 to circularly-polarized light may be easily realized by using as the circularly-polarized-light-selective reflecting-transmitting surface 6 a polarization plate cemented to a ¼ wavelength plate. Even when the two-dimensional display element 4 directly polarizes the projection image light L as in the case of a liquid crystal panel, sufficient functionality is obtained by using only a ¼ wavelength plate as the polarization-conversion element 5.

Figure 5:
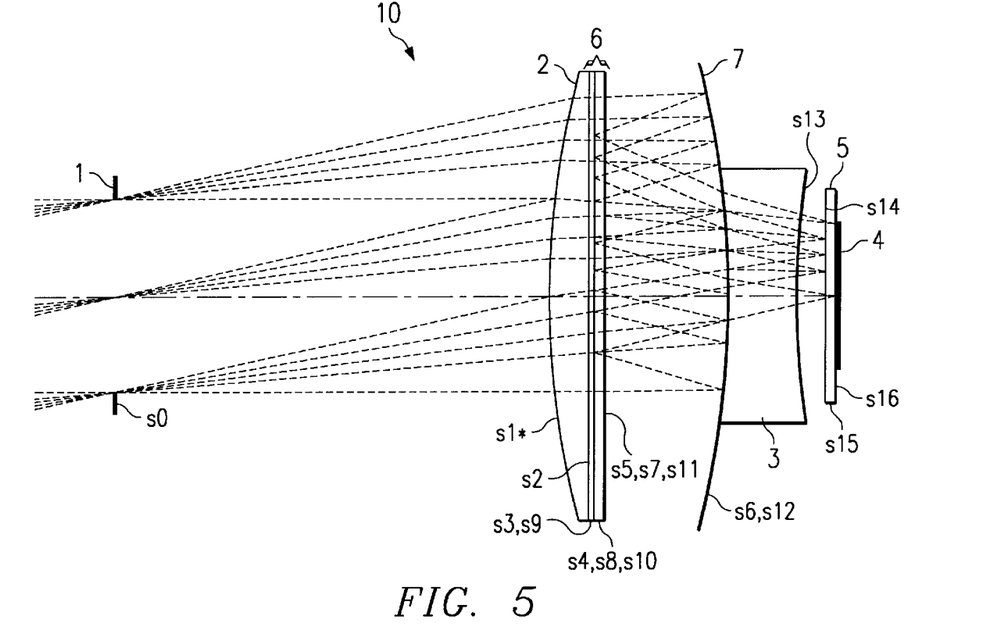
FIG. 5 is an optical diagram corresponding to the first embodiment.
Figure 6:
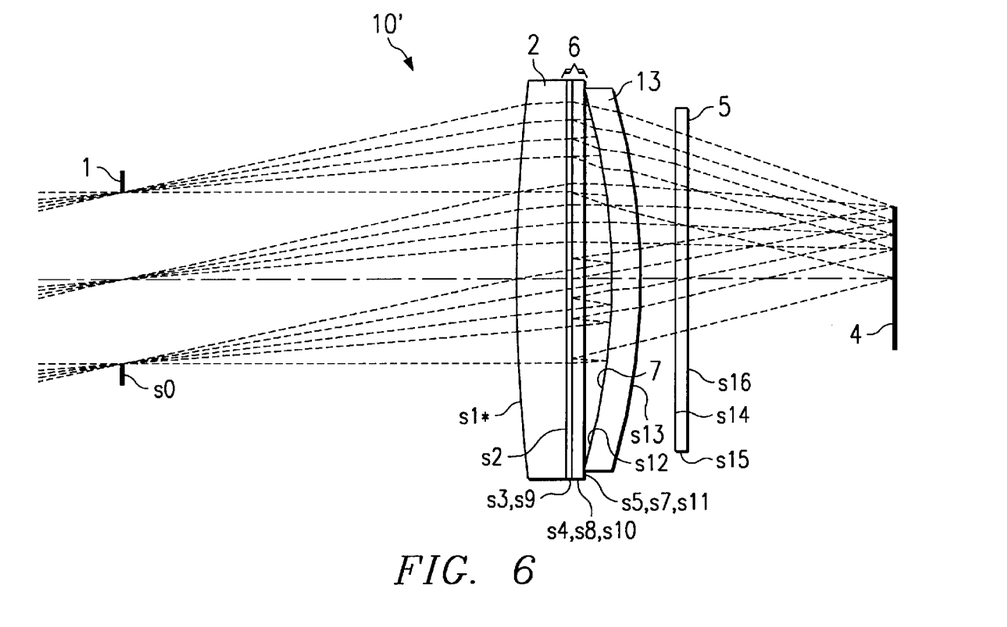
FIG. 6 is an optical diagram corresponding to the second embodiment.
Figure 7A:
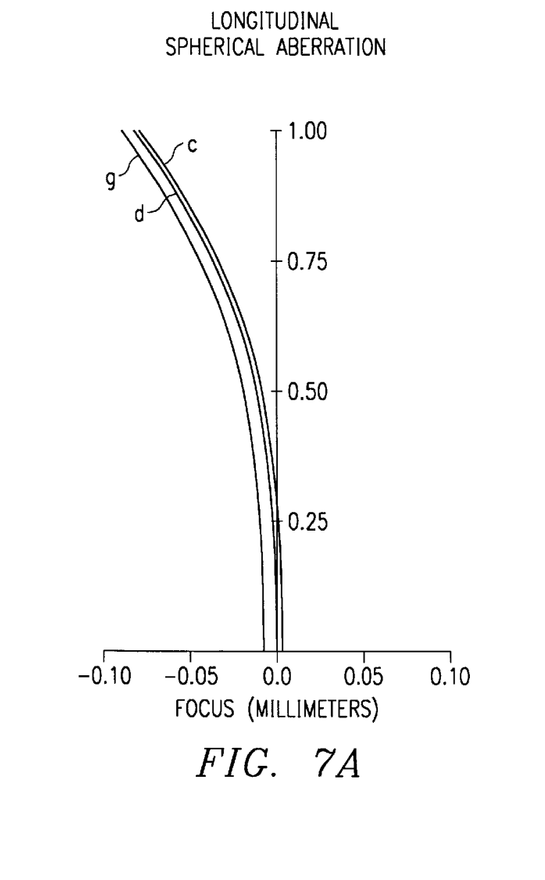
FIGS. 7A, 7B, and 7C are each an aberration diagram corresponding to the first embodiment.
Figure 7B:
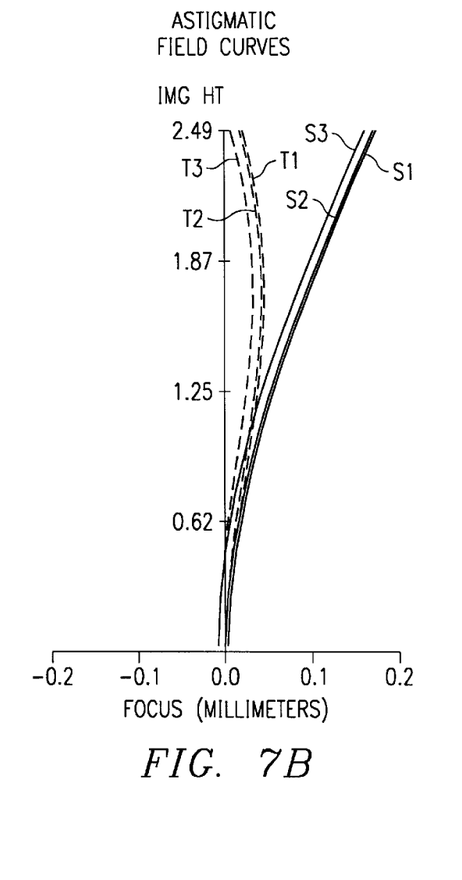
Figure 7C:
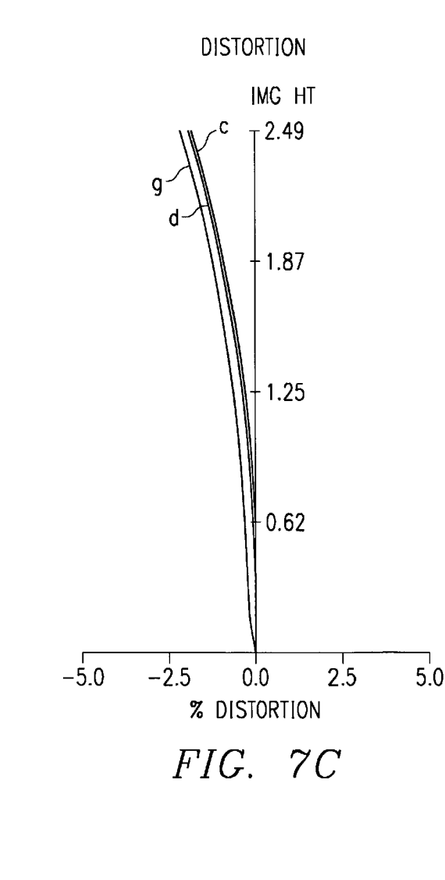
Figure 8A:
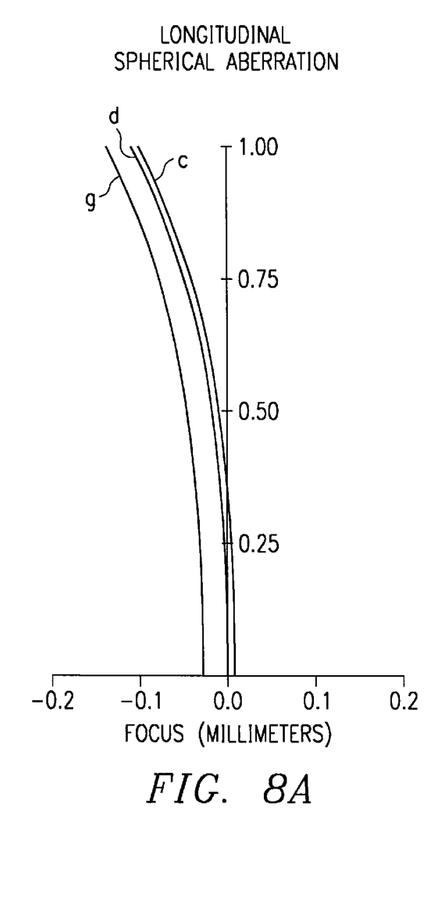
FIGS. 8A, 8B, and 8C are each an aberration diagram corresponding to the second embodiment.
Figure 8B:
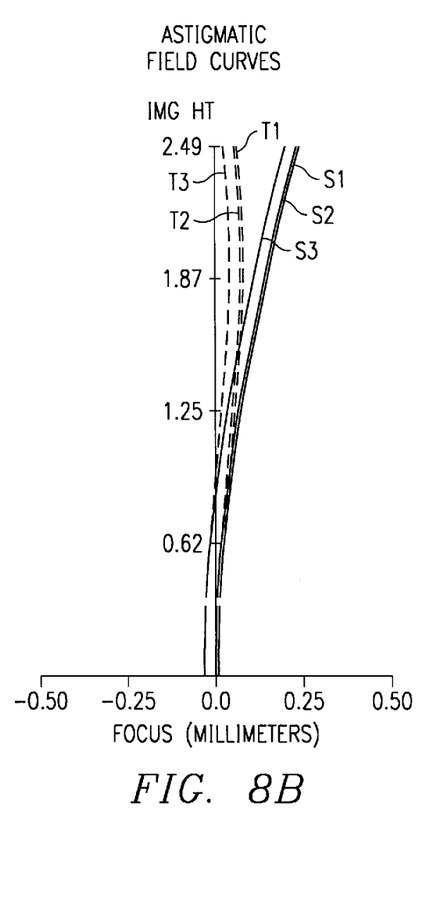
Figure 8C:
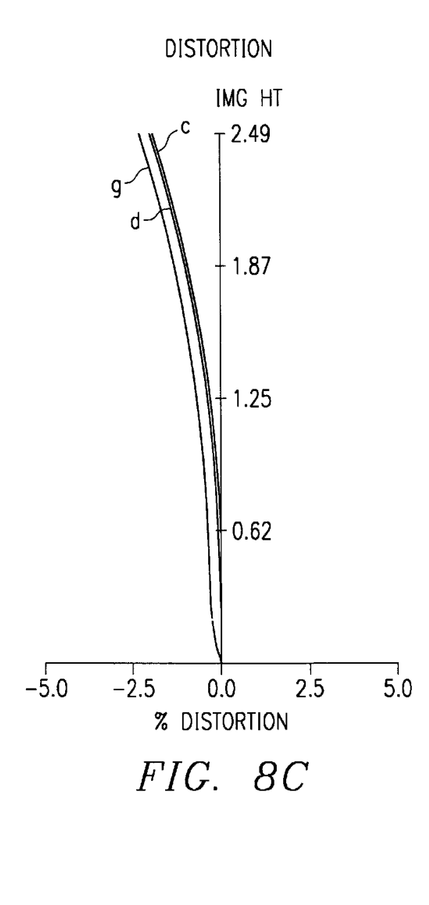
Figure 9A:
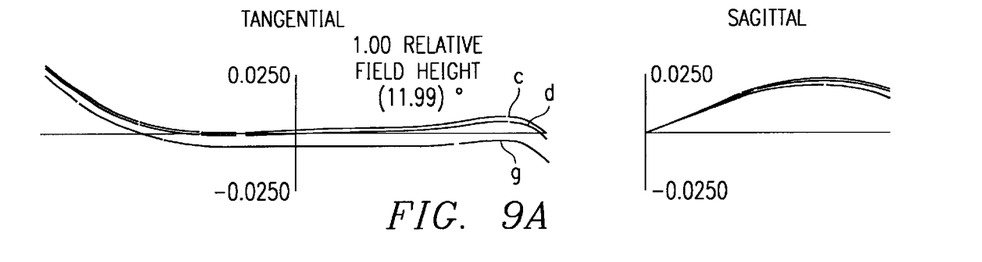
FIGS. 9A, 9B, 9C, 9D, and 9E are each a transverse aberration diagram corresponding to the first embodiment.
Figure 9B:
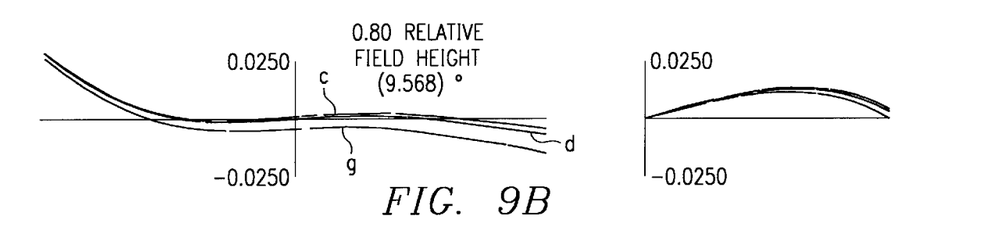
Figure 9C:
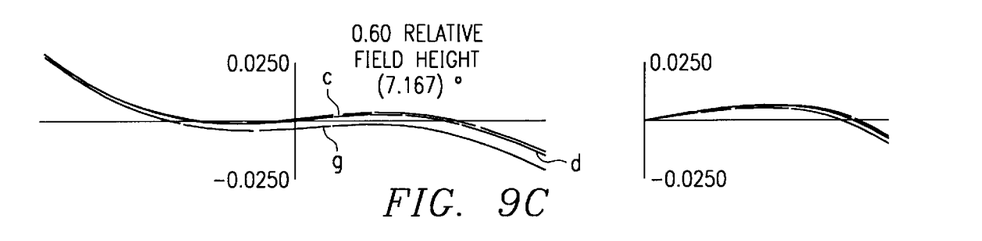
Figure 9D:
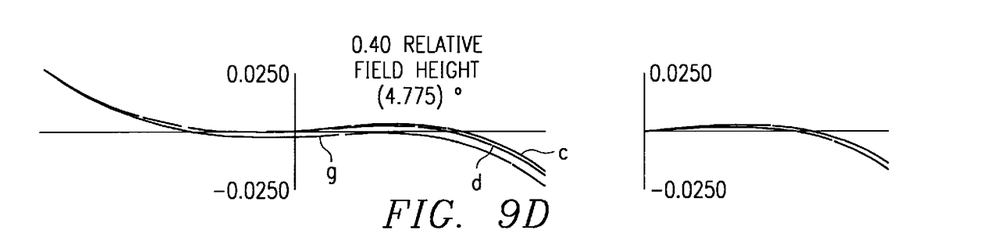
Figure 9E:
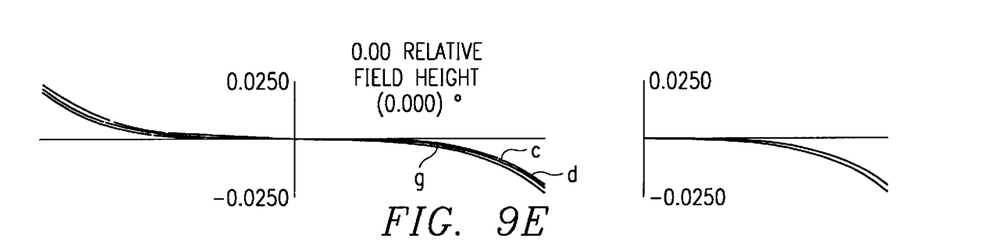
Figure 10A:
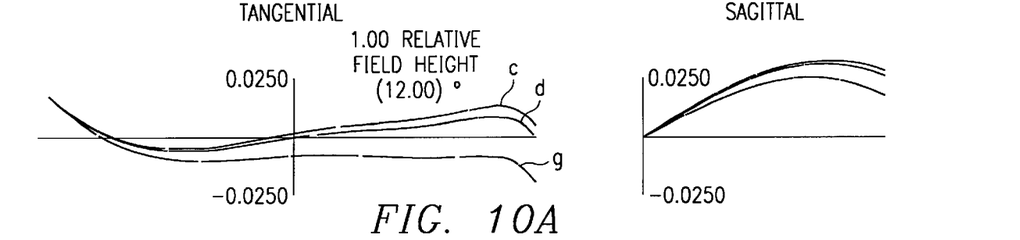
FIGS. 10A, 10B, 10C, 10D, and 10E are each a transverse aberration diagram corresponding to the second embodiment.
Figure 10B:
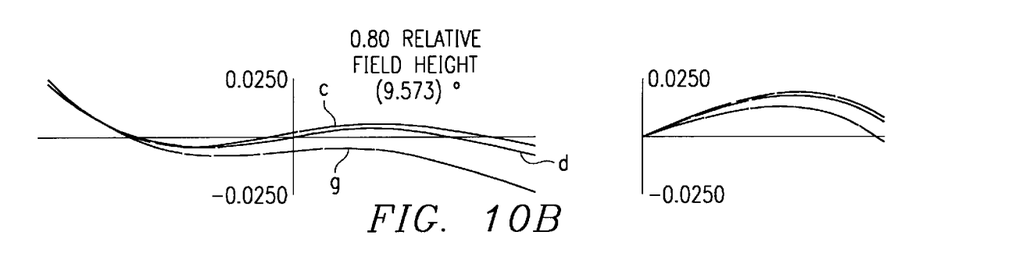
Figure 10C:
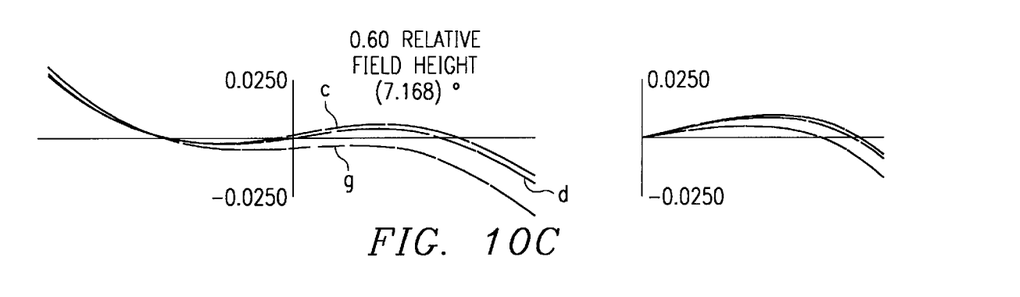
Figure 10D:
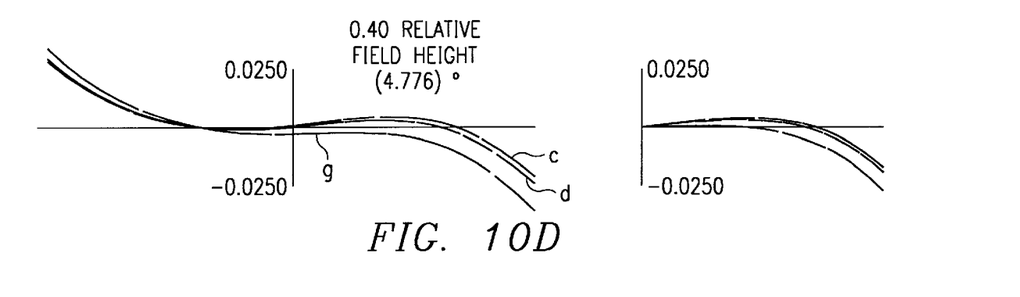
Figure 10E:
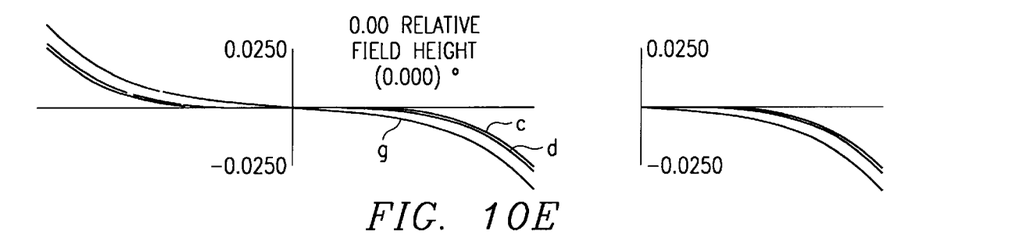

FIGS. 5 and 6 are optical structure diagrams corresponding to the first and second embodiments, respectively. These drawings further correspond to the basic structures shown in FIGS. 2 and 3, respectively. In the optical structure diagrams, the surface si (i=1,2,3,...) is the number i surface counting from the observer eye side, and an asterisk symbol (*) attached to the surface si indicates the surface si is an aspherical surface.

Numerical Example

The structure of the eyepiece optical system of the present invention is described below by way of specific examples using construction data and the like. Examples 1 and 2 respectively correspond to the previously described first and second embodiments, and the optical structure diagrams (FIGS. 5 and 6) showing the embodiments also respectively show the optical structure of the corresponding examples. In the construction data of each example, si (i=1,2,3, . . . ) represents the number i surface counting from the observer eye side, and ri (i=0,1,2,3, . . . ) represents the radius of curvature (mm) of the surface si.

Furthermore, di (i=0,1,2,3, . . . ) represents the number i axial spacing (mm) counting from the observer eye side, and Ni (i=1,2,3, . . . ) represents the d-line refractive index (Nd) of the number i optical element counting from the observer eye side. A surface si having an attached asterisk (*) represents an aspherical surface, and the shape of the aspherical surface is defined by the equations below. Each of the aspherical surface datum may be used together with other data.

Additionally, the displacement Z on the optical axis satisfies the equation:

$$Z=(C \cdot h^2)/[1+\sqrt{1-(1+K) \cdot C^2 \cdot h^2}]+\Sigma A i \cdot h^i$$

Wherein C represents the curvature (reciprocal of the radius of curvature), h represents the height from the optical axis, K represents the cone constant, Σ represents the sum of i (i=4, 6, 8, 10), and Ai represents the aspherical surface coefficient of the i degree.

First Embodiment

Transmission Type LCD

| [Surface] | [Radius of Curvature] | [Axial Distance] | [Refractive index λ = 587.6 nm] |
|---|---|---|---|
| s0 (Eye 1) | r0 = INF | d0 = 14.0 | 1.0 (air) |
| s1* | r1 = 28.807 | d1 = 1.047 | N1 = 1.4914 |
| s2 | r2 = INF | d2 = 0.1 | N2 = 1.5834(Polarization Plate) |
| s3 | r3 = INF | d3 = 0.1 | N3 = 1.5834(Reflection type Polarization Plate) |
| s4 | r4 = INF | d4 = 0.2 | N4 = 1.5834(1/4 Wavelength Plate) |
| s5 | r5 = INF | d5 = 3.718 | 1.0 (air) |
| s6 | r6 = 25.050 | d6 = −3.718 (Mirror) | |
| s7 | r7 = INF | d7 = −0.2 | N5 = 1.5834(1/4 Wavelength Plate) |
| s8 | r8 = INF | d8 = −0.1 | N6 = 1.5834(Reflection type Polarization Plate) |
| s9 | r9 = INF | d9 = 0.1 (Mirror) | |
| s10 | r10 = INF | d10 = 0.2 | N7 = 1.5834 |
| s11 | r11 = INF | d11 = 3.718 | 1.0 (air) |
| s12 | r12 = −25.050 | d12 = 2.0 | N8 = 1.6204 |
| s13 | r13 = 34.495 | d13 = 1.0 | 1.0 (air) |
| s14 | r14 = INF | d14 = 0.2 | N9 = 1.5834 (1/4 Wavelength Plate) |
| s15 | r15 = INF | d15 = 0.1 | N10 = 1.5834(Polarization Plate) |
| s16 | r16 = INF | | |

Aspherical Date of First Surface (s1)

K=0.0
A4=−0.467579509×10$^{-5}$
A6=0.219842638×10$^{-5}$
A8=−0.652835160×10$^{-7}$
A10=0.65296445×10$^{-9}$

Second Embodiment

Reflection Type LCD

| [Surface] | [Radius of Curvature] | [Axial Distance] | [Refractive index λ = 587.6 nm] |
|---|---|---|---|
| s0 (Eye 11) | r0 = INF | d0 = 14.0 | 1.0 (air) |
| s1* | r1 = 77.548 | d1 = 2.0 | N1 = 1.4914 |
| s2 | r2 = INF | d2 = 0.1 | N2 = 1.5834(Polarization Plate) |
| s3 | r3 = INF | d3 = 0.1 | N3 = 1.5834(Reflective type Polarization Plate) |
| s4 | r4 = INF | d4 = 0.2 | N4 = 1.5834(1/4 Wavelength Plate) |
| s5 | r5 = INF | d5 = 0.905 | 1.0 (air) |
| s6 | r6 = −25.835 | d6 = −0.905 (Mirror) | |
| s7 | r7 = INF | d7 = −0.2 | N5 = 1.5834(1/4 Wavelength Plate) |
| s8 | r8 = INF | d8 = −0.1 | N6 = 1.5834(Reflective Polarization Plate) |
| s9 | r9 = INF | d9 = 0.1 (Mirror) | |
| s10 | r10 = INF | d10 = 0.2 | N7 = 1.5834 |
| s11 | r11 = INF | d11 = 0.905 | 1.0 (air) |
| s12 | r12 = −25.835 | d12 = 1.0 | N8 = 1.6204 |
| s13 | r13 = −23.591 | d13 = 1.0 | 1.0 (air) |
| s14 | r14 = INF | d14 = 0.2 | N9 = 1.5834 (1/4 Wavelength Plate) |
| s15 | r15 = INF | d15 = 0. | N10 = 1.5834(Polarization Plate) |
| s16 | r16 = INF | | |

Aspherical Date of First Surface (s1)]

K=0.0
A4=−0.219271562×10$^{-4}$
A6=0.195774133×10$^{-5}$
A8=−0.629151309×10$^{-7}$
A10=0.646255519×10$^{-9}$

FIGS. 7A–7C and 8A–8C are aberration diagrams corresponding to examples 1 and 2, respectively, and show, sequentially from the left side, spherical aberration, astigmatism, and distortion. In the spherical aberration diagrams, the vertical axis represents the standardized value of the incident height to the pupil (observer eye) at its maximum height (i.e., the relative height cutting the entrance pupil plane), and the horizontal axis represents the focus position (amount of displacement in the optical axis direction from the paraxial image forming position; mm). Line c represents the amount of spherical aberration on the c-line (wavelength: 656.3 nm), line d represents the amount of spherical aberration on the d-line (wavelength: 587.6 nm), and line g represents the amount of spherical aberration on the g-line (wavelength: 435.8 nm).

In the astigmatism diagrams, the vertical axis represents the image height (mm), and the horizontal axis represents the focus position (amount of dislocation in the optical axis direction from the paraxial image forming position; mm). The solid lines are the astigmatism in the sagittal plane, line S1 represents the amount of astigmatism on the c-line (wavelength 656.3 nm), line S2 represents the amount of astigmatism on the d-line (wavelength: 587.6 nm), and line S3 represents the amount of astigmatism on the g-line (wavelength: 435.8 nm). The dashed line represents the astigmatism in the tangential plane; line T1 represents the amount of astigmatism on the c-line (wavelength 656.3 nm), line T2 represents the amount of astigmatism on the d-line (wavelength: 587.6 nm), and line T3 represents the amount of astigmatism on the g-line (wavelength: 435.8 nm).

In the distortion diagrams, the vertical axis represents the image height (mm), and the horizontal axis represents the percentage distortion (%). The c-line c represents the percentage distortion on the c-line (wavelength: 656.3 nm), line d represents the percentage distortion on the d-line (wavelength: 587.6 nm), and the line g represents the percentage distortion on the g-line (wavelength: 435.8 nm).

FIGS. 9A–9E and 10A–10E are transverse aberration diagrams corresponding to examples 1 and 2, respectively; the left side shows the transverse aberration in the sagittal plane, and the right side shows the transverse aberration in the tangential plane. In each drawing, the vertical axis represents the amount of aberration (mm), and the horizontal axis represents the pupil position. Line c represents the amount of transverse aberration on the c-line (wavelength: 656.3 nm), line d represents the amount of transverse aberration on the d-line (wavelength: 587.6 nm), and line g represents the amount of transverse aberration on the g-line (wavelength: 435.8 nm). The drawings 9A–9E and 10A–10E represent each field angle.

The present invention described above provides an eyepiece optical system suitable for use in a head-mounted display device which is capable of displaying a high quality virtual image and is thinner and has a shorter total length than conventional eyepiece optical systems. While the eyepiece optical system described herein including features of the present invention has been shown in combination with other elements to comprise a head-mounted display device, the eyepiece optical system including features of the present invention is not intended to be restricted to head-mounted display devices. Rather, the eyepiece optical system described herein including features of the present invention may be suitable for many applications including personal image projection display devices such as, for example, a viewfinder of various types of cameras.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An eyepiece optical system which enlarges and displays a projection image displayed on a two-dimensional display element onto an eye of an observer, said eyepiece optical system comprising sequentially from the observer eye:
    an aspherical resin lens having a first surface and a second surface opposite the first surface, wherein the first surface is an aspherical surface and the second surface is a substantially planar surface;
    a spherical glass lens having a first surface and a second surface opposite the first surface, wherein the first surface is a concave surface; and
    a polarization-conversion element for converting to polarized light the projection light from the two-dimensional display element, wherein the polarization-conversion element is disposed between the spherical-surface glass lens and the two-dimensional display element;
    wherein the second surface of the aspherical resin lens is provided with a circularly-polarized-light-selective reflecting-transmitting surface for selectively reflecting and transmitting projection image light from the two-dimensional display element depending on a rotation direction of circularly-polarized rays of the projection image light,
    wherein at least one of the first surface and the second surface of the spherical glass lens is provided with a semi-transparent mirror surface.

2. An eyepiece optical system in accordance with claim 1, wherein the second surface of the spherical glass lens is a convex surface.

3. An eyepiece optical system in accordance with claim 2, wherein the first surface of the spherical glass lens is provided with the semi-transparent mirror surface.

4. An eyepiece optical system in accordance with claim 2, wherein the second surface of the spherical glass lens is provided with the semi-transparent mirror surface.

5. An eyepiece optical system in accordance with claim 1, wherein the second surface of the spherical glass lens is a substantially planar surface.

6. An eyepiece optical system in accordance with claim 5, wherein the first surface of the spherical glass lens is provided with the semi-transparent mirror surface.

7. An eyepiece optical system in accordance with claim 1, wherein the second surface of the spherical glass lens is a concave surface.

8. An eyepiece optical system in accordance with claim 7, wherein the first surface of the spherical glass lens is provided with the semi-transparent mirror surface.

9. An eyepiece optical system in accordance with claim 1, wherein the circularly-polarized-light-selective reflecting-transmitting surface is formed of cholesteric liquid crystal.

10. An eyepiece optical system in accordance with claim 1, wherein the circularly-polarized-light-selective reflecting-transmitting surface comprises a ¼ wavelength plate and a reflective type polarizing plate.

11. An eyepiece optical system in accordance with claim 1, wherein the polarization-conversion element comprises a polarizing plate and a ¼ wavelength plate.

12. An eyepiece optical system in accordance with claim 1, wherein the two-dimensional display element is a liquid crystal panel.

13. An eyepiece optical system in accordance with claim 1, wherein the polarization conversion element is a ¼ wavelength plate.

14. A head mounted display apparatus comprising:
    a frame member having a first edge portion and a second edge portion opposite the first edge portion;
    a support member mounted to the first edge portion of the frame member;
    at least one eyepiece optical system supported by the frame member for enlarging and displaying an image onto an eye of an observer, each eyepiece optical system comprising sequentially from the observer eye:
    an aspherical resin lens having a first surface and a second surface opposite the first surface, wherein the first surface is an aspherical surface and the second surface is a substantially planar surface;
    a spherical glass lens having a first surface and a second surface opposite the first surface, wherein the first surface is a concave surface;
    a polarization-conversion element; and
    a two-dimensional display element for projecting light,
    wherein the polarization-conversion element is for converting the projection light from the two-dimensional element to polarized light, wherein the second surface of the aspherical resin lens is provided with a circularly-polarized-light-selective reflecting-transmitting surface for selectively reflecting and transmitting projection image light from the two-dimensional display element depending on the rotation direction of the circularly-polarized rays, wherein at least one of the first surface and the second surface of the spherical glass lens is provided with a semi-transparent mirror surface.

15. A head mounted display apparatus in accordance with claim 14, wherein the second surface of the spherical glass lens is a convex surface.

16. A head mounted display apparatus in accordance with claim 15, wherein the first surface of the spherical glass lens is provided with a semi-transparent mirror surface.

17. A head mounted display apparatus in accordance with claim 15, wherein the second surface of the spherical glass lens is provided with a semi-transparent mirror surface.

18. A head mounted display apparatus in accordance with claim 14, wherein the second surface of the spherical glass lens is a planar surface.

19. A head mounted display apparatus in accordance with claim 18, wherein the first surface of the spherical glass lens is provided with a semi-transparent mirror surface.

20. A head mounted display apparatus in accordance with claim 14, wherein the second surface of the spherical glass lens is a concave surface.

21. A head mounted display apparatus in accordance with claim 20, wherein the first surface of the spherical glass lens is provided with a semi-transparent mirror surface.

22. A head mounted display apparatus in accordance with claim 14, wherein the circularly-polarized-light-selective reflecting-transmitting surface is formed of cholesteric liquid crystal.

23. A head mounted display apparatus in accordance with claim 14, wherein the circularly-polarized-light-selective reflecting-transmitting surface comprises a ¼ wavelength plate and a reflective type polarizing plate.

24. A head mounted display apparatus in accordance with claim 14, wherein the polarization-conversion element comprises a polarizing plate and a ¼ wavelength plate.

25. A head mounted display apparatus in accordance with claim 14, wherein the two-dimensional display element is a liquid crystal panel.

26. A head mounted display apparatus in accordance with claim 14, wherein the polarization conversion element is a ¼ wavelength plate.

27. A head mounted display apparatus in accordance with claim 14, wherein the support member is further fixed to the second edge portion of the frame member.

28. A head mounted display apparatus in accordance with claim 14, wherein the at least one eyepiece optical system includes a second eyepiece optical system supported by the frame member.

29. A head mounted display apparatus in accordance with claim 14, further comprising a second support member mounted to the second edge portion of the frame member.

* * * * *

UNITED STATES PATENT AND TRADEMARK OFFICE
CERTIFICATE OF CORRECTION

PATENT NO.    : 6,519,090 B2                                        Page 1 of 1
DATED         : February 11, 2003
INVENTOR(S)   : Takeshi Endo et al.

It is certified that error appears in the above-identified patent and that said Letters Patent is hereby corrected as shown below:

Column 7,
Line 52, after "r6=", delete "25.050", and insert -- 25.050 --.

Column 8,
Line 1, delete "Aspherical Date of First Surface (sl)", and insert -- [Aspherical Data of First Surface (sl)] --.
Lines 18 and 19, after "d3 = 0.1 N3 = 1.5834", delete "(Reflective type Polarization Plate)", and insert -- (Reflective Polarization Plate) --.
Line 39, delete "Aspherical Date of First Surface (sl)]", and insert -- [Aspherical Data of First Surface (sl)] --.

Signed and Sealed this

Twenty-fourth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,519,090 B2
DATED : February 11, 2003
INVENTOR(S) : Takeshi Endo et al.

It is certified that error appears in the above-identified patent and that said Letters Patent is hereby corrected as shown below:

Column 7,
Line 52, after "r6=", delete "25.050", and insert -- -25.050 --.

Column 8,
Line 1, delete "Aspherical Date of First Surface (sl)", and insert -- [Aspherical Data of First Surface (sl)] --.
Lines 18 and 19, after "d3 = 0.1 N3 = 1.5834", delete "(Reflective type Polarization Plate)", and insert -- (Reflective Polarization Plate) --.
Line 39, delete "Aspherical Date of First Surface (sl)]", and insert -- [Aspherical Data of First Surface (sl)] --.

This certificate supersedes Certificate of Correction issued February 24, 2004.

Signed and Sealed this

First Day of June, 2004

JON W. DUDAS
*Acting Director of the United States Patent and Trademark Office*